United States Patent
Atia et al.

(10) Patent No.: US 10,840,850 B1
(45) Date of Patent: Nov. 17, 2020

(54) MOUNTING APPARATUS TO SECURE SOLAR PANEL RAILS TO ASPHALT SHINGLE ROOFS

(71) Applicants: Moti Atia, North Hollywood, CA (US); Netanel Yoshua Levi, North Hollywood, CA (US)

(72) Inventors: Moti Atia, North Hollywood, CA (US); Netanel Yoshua Levi, North Hollywood, CA (US)

( * ) Notice: Subject to any disclaimer, the term of this patent is extended or adjusted under 35 U.S.C. 154(b) by 0 days.

(21) Appl. No.: 16/388,215

(22) Filed: Apr. 18, 2019

Related U.S. Application Data (63) Continuation-in-part of application No. 15/678,648, filed on Aug. 16, 2017, now abandoned, which is a continuation-in-part of application No. 15/667,421, filed on Aug. 2, 2017, now Pat. No. 9,954,479, and a continuation-in-part of application No. 15/667,454, filed on Aug. 2, 2017, now Pat. No. 10,236,821, and a continuation-in-part of application No. 15/667,474, filed on Aug. 2, 2017, now Pat. No. 10,320,325.

(60) Provisional application No. 62/375,763, filed on Aug. 16, 2016.

(51) Int. Cl.
  *H02S 20/23* (2014.01)
  *F16B 5/12* (2006.01)
  *H02S 20/24* (2014.01)
  *H02S 30/10* (2014.01)

(52) U.S. Cl.
  CPC ............. *H02S 20/23* (2014.12); *F16B 5/123* (2013.01); *H02S 20/24* (2014.12); *H02S 30/10* (2014.12)

(58) Field of Classification Search
  CPC .......... H02S 20/23; H02S 30/10; H02S 20/24; F16B 5/123; F16B 5/0225
  See application file for complete search history.

(56) References Cited

U.S. PATENT DOCUMENTS

| | | |
|---|---|---|
| 2,530,265 A | 11/1950 | Phalen |
| 2,896,893 A | 7/1959 | Oliver |
| D260,235 S | 8/1981 | Anderson |
| 4,321,745 A | 3/1982 | Ford |
| 5,906,080 A | 5/1999 | diGirolamo |
| 7,762,027 B1 | 7/2010 | Wentworth |
| 8,122,648 B1 * | 2/2012 | Liu .......................... F24S 25/61 52/58 |

(Continued)

FOREIGN PATENT DOCUMENTS

WO  WO-2017019999 A1 *  2/2017  ............ F16B 39/284

*Primary Examiner* — Basil S Katcheves
*Assistant Examiner* — Omar F Hijaz
(74) *Attorney, Agent, or Firm* — Plager Schack LLP; Mark H. Plager; Eric Liou (57) ABSTRACT

A mounting apparatus to secure a pair of solar panel rails to an asphalt shingle roof and minimize penetrations or damage to a rafter of the roof is provided. The mounting apparatus permits the solar panel rails to support adjacent solar panels thereon. The mounting apparatus includes a lower assembly coupled to the asphalt shingle roof and having a screw and flashing disposed on an asphalt shingle and coupled together, and an upper arm assembly coupled to the screw of the lower assembly and having a generally U-shaped member with a pair of upright arms continuously connected to opposing ends of a horizontal arm, each upright arm having a slot to receive a fastener that secures one of the pair of solar panel rails thereto.

12 Claims, 5 Drawing Sheets

(56) References Cited

U.S. PATENT DOCUMENTS

| | | |
|---|---|---|
| 8,448,405 B2 | 5/2013 | Schaefer |
| 8,453,986 B2 | 6/2013 | Schnitzer |
| 8,627,617 B2 | 1/2014 | Haddock |
| 8,689,517 B2 | 4/2014 | Schaefer |
| 8,806,815 B1 | 8/2014 | Liu |
| 8,839,575 B1 | 9/2014 | Liu |
| 8,875,455 B1 | 11/2014 | Yang |
| 8,938,932 B1 | 1/2015 | Wentworth |
| 9,194,130 B1 | 11/2015 | Stanley |
| 9,252,702 B2 | 2/2016 | Chiu |
| 9,413,286 B2 | 8/2016 | Danning |
| 9,531,319 B2 | 12/2016 | Braunstein |
| 9,595,911 B2 | 3/2017 | McPheeters |
| 9,647,433 B2 | 5/2017 | Meine |
| 9,813,012 B2 | 11/2017 | Wentworth |
| 9,853,594 B2 | 12/2017 | Almy |
| 9,869,085 B2 | 1/2018 | Evans |
| 9,876,462 B2 | 4/2018 | Hudson |
| 9,954,479 B1 | 4/2018 | Atia |
| 2006/0053706 A1* | 3/2006 | Russell .............. F24S 25/16 52/173.3 |
| 2009/0019796 A1 | 1/2009 | Liebendorfer |
| 2010/0236155 A1* | 9/2010 | Lanza .............. E04D 1/30 52/58 |
| 2011/0120047 A1* | 5/2011 | Stearns .............. E04D 13/10 52/698 |
| 2011/0179727 A1 | 7/2011 | Liu |
| 2012/0144760 A1 | 6/2012 | Schaefer |
| 2012/0298817 A1 | 11/2012 | West |
| 2013/0133270 A1 | 5/2013 | West |
| 2016/0111996 A1 | 4/2016 | Stephan |
| 2016/0308486 A1 | 10/2016 | Atia |
| 2017/0299102 A1 | 10/2017 | Ash |

\* cited by examiner

MOUNTING APPARATUS TO SECURE SOLAR PANEL RAILS TO ASPHALT SHINGLE ROOFS

RELATED APPLICATION

The application claims priority to non-provisional patent application U.S. Ser. No. 15/678,648 filed on Aug. 16, 2017, the entire contents of which is herein incorporated by reference. Non-provisional patent application U.S. Ser. No. 15/678,648 claims priority to provisional patent application U.S. Ser. No. 62/375,763 filed on Aug. 16, 2016, the entire contents of which is herein incorporated by reference. Non-provisional patent application U.S. Ser. No. 15/678,648 claims priority to non-provisional patent application U.S. Ser. No. 15/667,474 filed on Aug. 2, 2017, the entire contents of which is herein incorporated by reference. Non-provisional patent application U.S. Ser. No. 15/678,648 claims priority to non-provisional patent application U.S. Ser. No. 15/667,421 filed on Aug. 2, 2017, the entire contents of which is herein incorporated by reference. Non-provisional patent application U.S. Ser. No. 15/678,648 claims priority to non-provisional patent application U.S. Ser. No. 15/667,454 filed on Aug. 2, 2017, the entire contents of which is herein incorporated by reference.

BACKGROUND

The embodiments herein relate generally to mounting apparatuses used to secure a solar panel rail to a roof. More specifically, embodiments of the invention relate to a mounting apparatus used to secure a pair of solar panel rails to composition roofing, which is commonly known as asphalt shingle roofs.

Solar panels are generally positioned adjacent to each other and secured to the building's roof by rails and fasteners. In many instances, each solar panel is secured within a frame that is coupled to the building's roof by a plurality of solar panel rails and mounting devices. Each solar panel rail is mechanically fastened to a mounting device, which is coupled to a rafter of the roof by mechanical fasteners such as screws or bolts.

Current solar panel rail mounting devices are designed to support a single rail. Since each solar panel rail is coupled to a separate mounting device, the number of total penetrations into the roof's rafters by mechanical fasteners is increased. These added penetrations into the roof increase the amount of labor required to install the solar panels on the roof, the chance of leakage in the roof from precipitation, and likelihood of damage suffered by the roof's structural elements such as the rafters and/or other components.

Another challenge in installing solar panel rail mounting devices to the roof include properly sealing any penetrations in the roof's components such as the rafters to prevent leaks into the building from precipitation. A variety of roof mount sealing assemblies are disclosed in U.S. Pat. No. 8,689,517. However, these assemblies comprise complicated components to install and/or a limited seal around the penetrations into the roof.

As such, there is a need in the industry for a mounting apparatus that overcomes the limitations of the prior art, which permits the attachment of solar panel rails to asphalt shingle roofs. There is a further need for the mounting apparatus to support a pair of solar panel rails thereon to minimize the amount of penetration and/or damage to the roof upon installation. There is a further need for the mounting apparatus to allow an improved and complete seal installation without modifying the structure of the roof.

SUMMARY

In certain embodiments, a mounting apparatus to secure a pair of solar panel rails to an asphalt shingle roof and minimize penetrations or damage to a rafter of the roof positioned below a plurality of asphalt shingles is provided. The mounting apparatus is configured to permit the pair of solar panel rails to support a pair of adjacent solar panels thereon.

In certain embodiments, the mounting apparatus comprises a lower assembly coupled to the asphalt shingle roof and comprising a flashing, a first washer and a screw, the flashing comprising a plate disposed on one of the plurality of asphalt shingles and comprising a flange, the flange comprising a tubular member extending along a perimeter of an opening in the flashing and comprising an inner wall and an outer wall, the first washer disposed on the flashing and directly in contact with a lower portion of the outer wall of the tubular member of the flange, the screw extending through the first washer, the opening in the flashing and the one of the plurality of asphalt shingles, and an upper arm assembly directly contacting and coupled to the screw of the lower assembly, the upper arm assembly comprising a generally U-shaped member comprising a pair of upright arms continuously connected to opposing ends of a horizontal arm, the horizontal arm of the generally U-shaped member comprising an opening configured to permit the screw to pass therethrough and comprising an upper inner wall continuously connected to a lower inner wall, the lower inner wall of the opening in the horizontal arm directly contacting a remaining portion of the outer wall of the tubular member of the flange, wherein each upright arm in the pair of upright arms in the upper arm assembly comprises a slot configured to receive a fastener that secures one of the pair of solar panel rails thereto, thereby permitting the mounting apparatus to support the pair of solar panel rails above the asphalt shingle roof.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
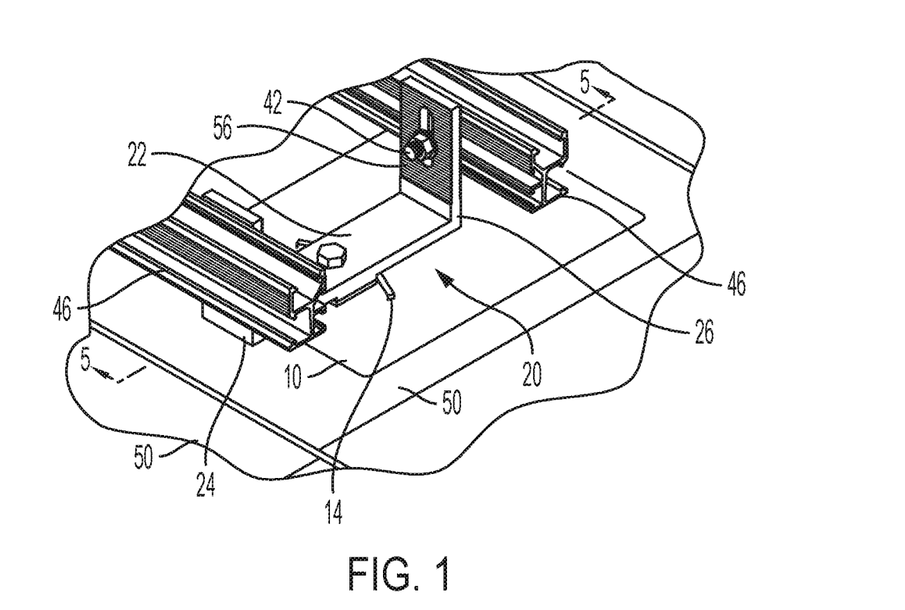
FIG. 1 depicts a perspective view of certain embodiments of the mounting apparatus shown in use.
Figure 2:
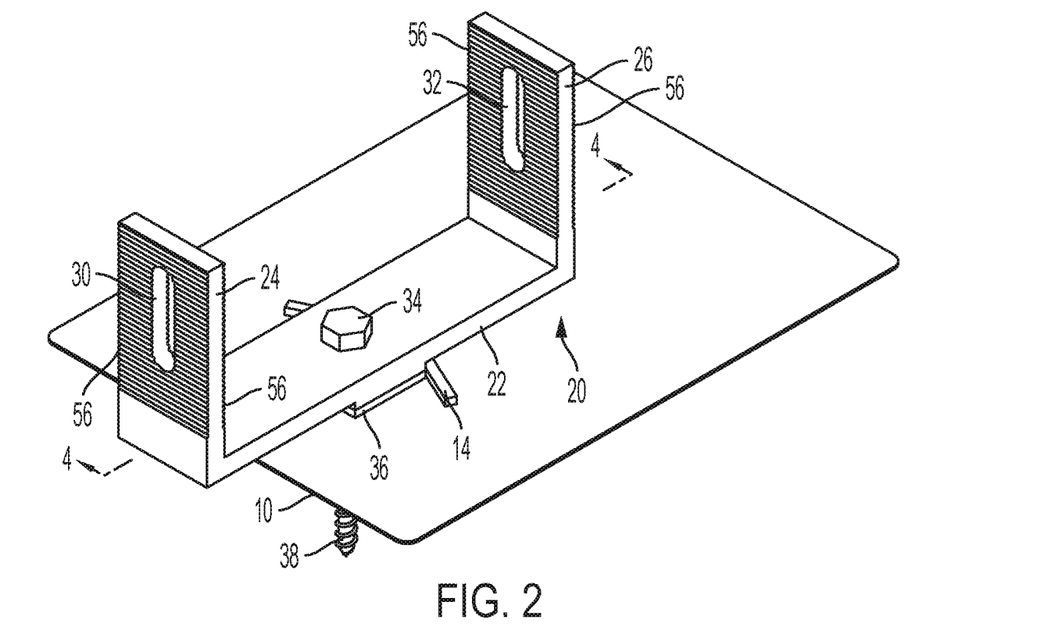
FIG. 2 depicts a perspective view of certain embodiments of the mounting apparatus.
Figure 3:
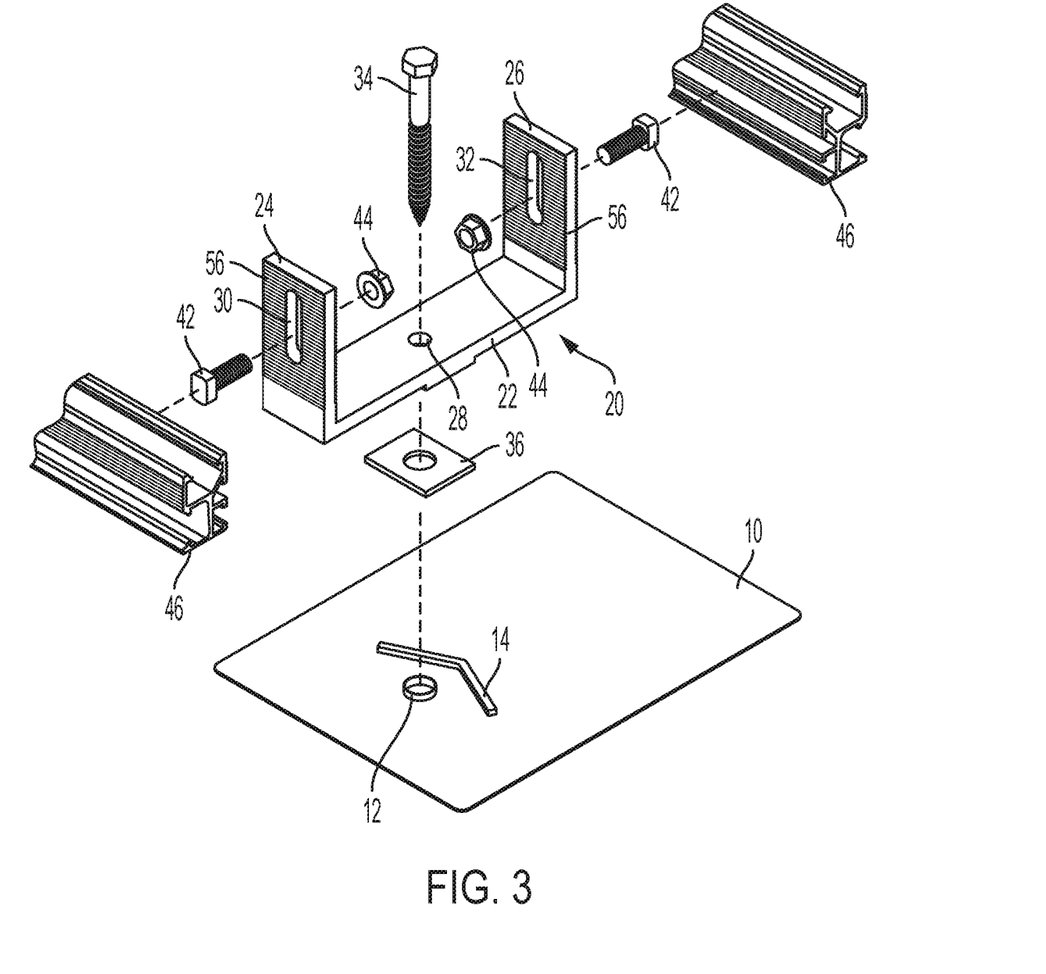
FIG. 3 depicts an exploded view of certain embodiments of the mounting apparatus.

As depicted in FIGS. 1-3, the mounting apparatus is configured to secure a pair of solar panel rails 46 above a roof comprising a plurality of asphalt shingles 50. However, the mounting apparatus may be used with alternative types of roof tiles.

In one embodiment, the pair of solar panel rails 46 is designed to support side portions of a pair of solar panels (not shown) positioned adjacent to each other. In certain embodiments, each solar panel may be disposed within a frame (not shown) that is secured to solar panel rail 46 by a fastener such as a clamp, bolt, or the like. It shall be appreciated that each solar panel may be coupled to one or more additional rails throughout the panel to provide additional support when securing the solar panel to the roof.

Figure 4:
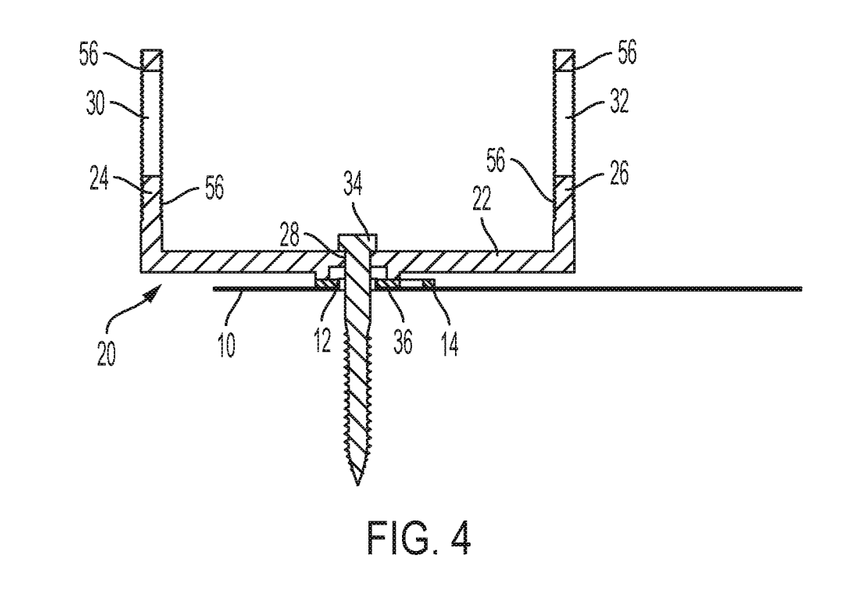
FIG. 4 depicts a section view of certain embodiments of the mounting apparatus taken along line 4-4 in FIG. 2.
Figure 5:
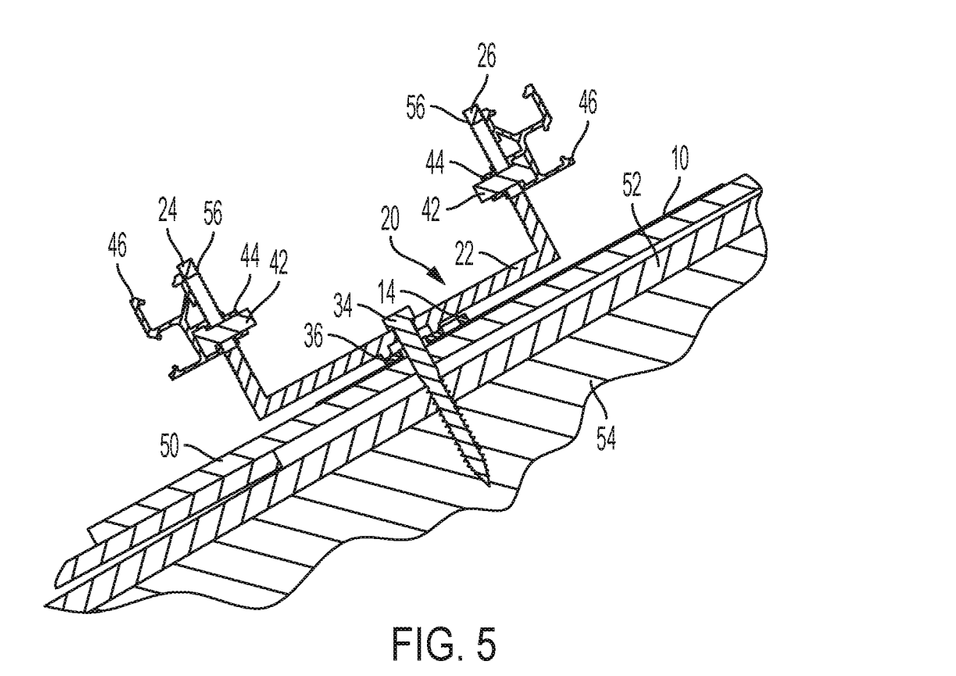
FIG. 5 depicts a section view of certain embodiments of the mounting apparatus taken along line 5-5 in FIG. 1.

In certain embodiments, the mounting apparatus generally comprises a lower assembly coupled to the asphalt shingle roof and upper arm assembly 20 coupled to the lower assembly. As depicted in FIGS. 3-5, the lower assembly comprises flashing 10, lag screw 34 and washer 36.

Flashing 10 comprises a generally rectangular plate made from aluminum with approximate dimensions of 225 millimeters×305 millimeters. In one embodiment, flashing 10 comprises an opening configured to receive lag screw 34 and flange 12 coupled thereto. The opening's center in the plate is preferably positioned off-center in flashing 10 and located approximately 75 millimeters from a side edge. A generally V-shaped guide rail 14 is coupled to flashing 10 and positioned proximate flange 12. The tips of the generally V-shaped guide rail 14 are positioned approximately 86 millimeters from a side edge of flashing 10. Guide rail 14 is configured to deflect water, other fluid or moisture away from the opening in flashing 10. This enhances the seal of the mounting apparatus when coupled to the asphalt shingle roof.

Washer 36 is a generally rectangular washer made from UV-rated silicone. The center opening of washer 36 is configured to receive lag screw 34. Lag screw 34 is preferably made from stainless steel and comprises threads disposed around an intermediate portion to the end tip of the screw. Lag screw 34 is configured to secure both upper arm assembly 20 and flashing 10 to the asphalt shingle roof. More specifically, lag screw 34 extends through upper arm assembly 20, the opening in washer 36 and the opening in flashing 10 to penetrate through asphalt shingle 50, weatherproof layer 52 and rafter 54 of the roof.

As depicted in FIGS. 2-3, upper arm assembly 20 is preferably made from aluminum and comprises a generally U-shaped member comprising a pair of symmetric half members continuously connected together. Specifically, the U-shaped member comprises horizontal arm 22, first upright arm 24 and second upright arm 26. Horizontal arm 22 comprises central opening 28, which is configured to receive lag screw 34.

First upright arm 24 comprises first slot 30 and second upright arm 26 comprises second slot 32. Each of first slot 30 and second slot 32 is sufficiently large to receive T-bolt 42, which is configured to be coupled to nut 44. In one embodiment, the inner and outer surfaces of first and second upright arms 24, 26 comprise a plurality of grooves 56 that surround first and second slots 30, 32.

In operation, one or more of the following steps may be performed to secure the mounting apparatus to the pair of solar panel rails 46 and the roof. First, a chalk line is generally disposed on the roof across asphalt shingles 50 to indicate the general location where solar panel rails 46 will be installed. An instrument such as a stud finder may be used to directly locate the position of rafter 54. Once rafter 54 is located, a ¼" pilot hole is drilled through asphalt shingle 50, weatherproof layer 52 and rafter 54. The ¼" drilled hole is backfilled with a sealant.

As depicted in FIG. 5, central opening 28 of upper arm assembly 20, the opening of washer 36 and the opening of flashing 10 are aligned with the drilled ¼" pilot hole. Once aligned, lag screw 34 is disposed through the openings in upper arm assembly 20, washer 36 and flashing 10 to penetrate through the ¼" pilot hole extending through asphalt shingle 50, weatherproof layer 52 and rafter 54. In one embodiment, a sealant is applied to the bottom of flashing 10 prior to being disposed around lag screw 34. Once assembled, lag screw 34 extends through the central opening and flange 12 of flashing 10, which is directly coupled to asphalt shingle 50.

This installation of lag screw 34, washer 36 and flashing 10 is advantageous because it creates a complete seal of the penetration into rafter 54 of the asphalt shingle roof without modifying the structure of the roof. Washer 36 helps to seal the opening in flashing 10 and prevent the leakage of precipitation such as rain, snow, dew and other moisture into the asphalt shingle roof through the ¼" drilled pilot hole. The generally V-shaped guide rail 14 serves as a barrier that deflects moisture and precipitation drifting on the plate away from the opening in flashing 10. As a result, the seal of the penetration into the asphalt shingle roof is enhanced.

Upper arm assembly 20 is coupled to the lower assembly by the insertion of lag screw 34 through central opening 28 of horizontal arm 22. As depicted in FIGS. 1 and 5, a pair of solar panel rails 46 is coupled to upper arm assembly 20. A first solar panel rail 46 is coupled to first upright arm 24 of upper arm assembly 20 by T-bolt 42 and nut 44. T-bolt 42 extends through first slot 30 in first upright arm 24 and is secured in place by nut 44. Similarly, a second solar panel rail 46 is coupled to second upright arm 26 of upper arm assembly 20 by T-bolt 42 and nut 44. T-bolt 42 extends through second slot 32 in second upright arm 26 and is secured in place by nut 44. Although the figures depict solar panel rails 46 coupled to the outer surfaces of first and second upright arms 24, 26, it shall be appreciated that solar panel rails 46 can alternatively be coupled to the inner surfaces of first and second upright arms 24, 26.

Figure 6:
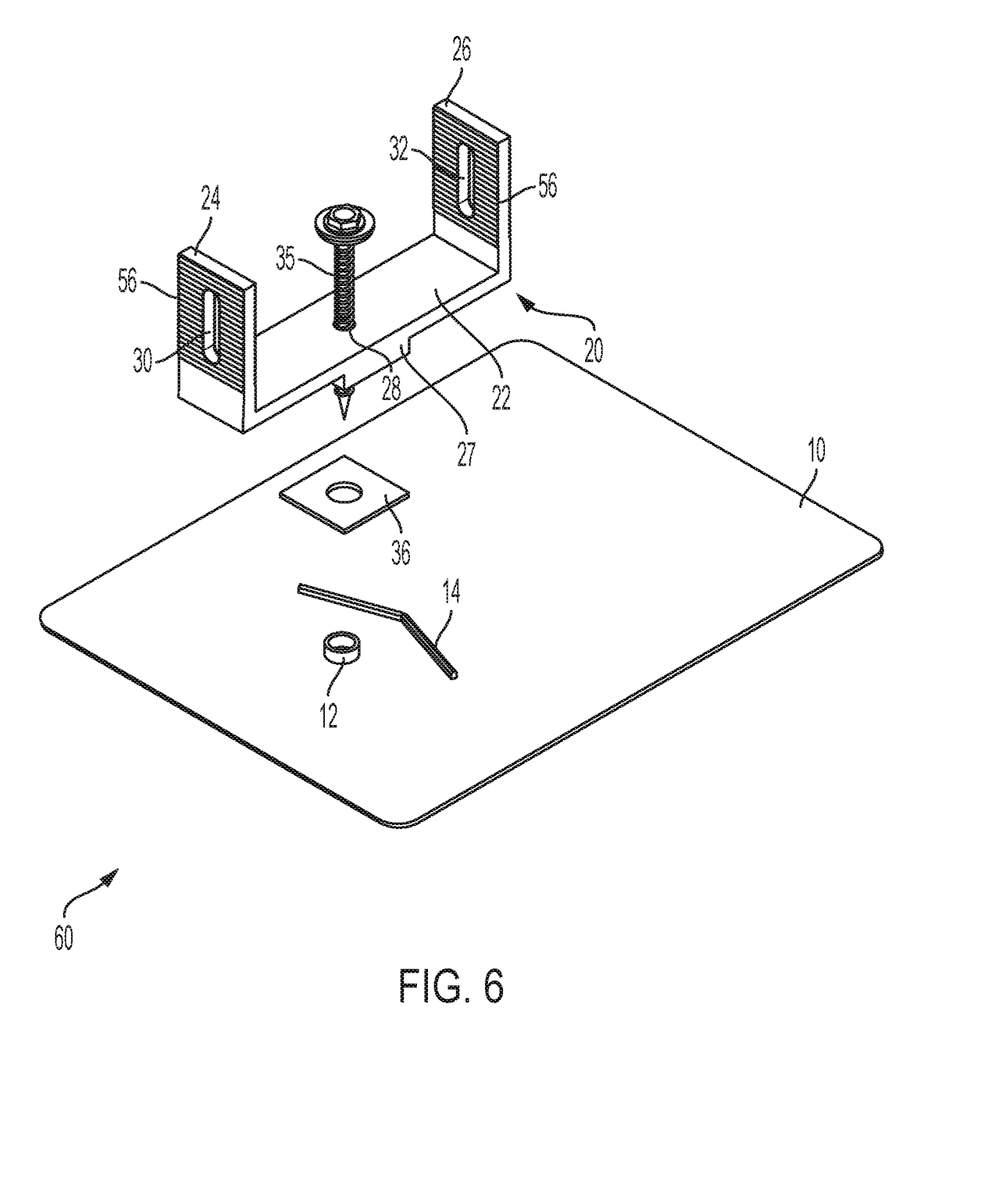
FIG. 6 depicts a perspective view of an alternative embodiment of the mounting apparatus.
Figure 7:
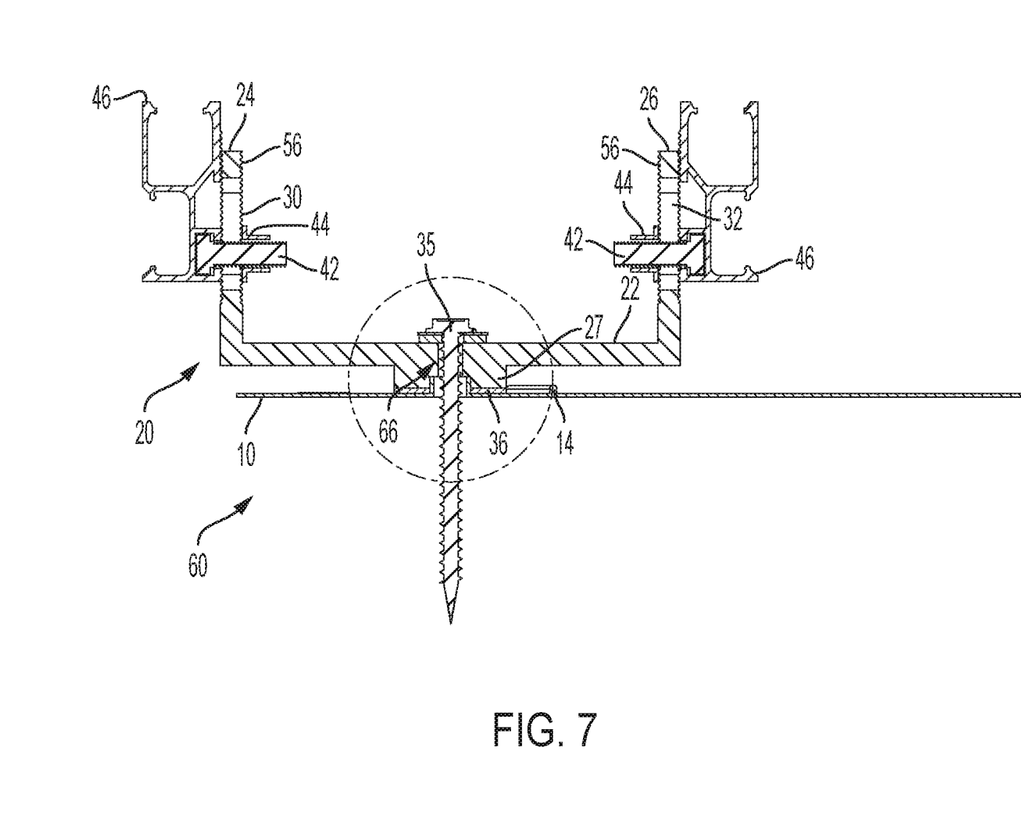
FIG. 7 depicts a section view of the alternative embodiment of the mounting apparatus.
Figure 8:
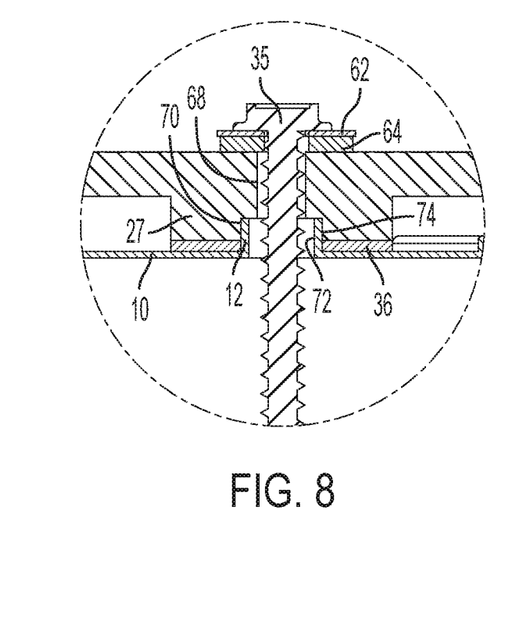
FIG. 8 depicts a section view of the alternative embodiment of the mounting apparatus.

In an alternate embodiment as depicted in FIGS. 6-8, alternate mounting apparatus 60 comprises components substantially similar to the mounting apparatus previously described and is used in substantially the same manner. More specifically, alternate mounting apparatus 60 generally comprises a lower assembly coupled to the asphalt shingle roof and upper arm assembly 20 coupled to the lower assembly.

In certain embodiments of the invention, alternate mounting apparatus 60 comprises the same components as the mounting apparatus previously described in other embodiments including flashing 10, flange 12, V-shaped guide rail 14 and washer 36 in the lower assembly, and a generally U-shaped upper arm assembly 20 comprising horizontal arm 22, first upright arm 24, second upright arm 26, first slot 30, second slot 32, t-bolts 42, nuts 44 and grooves 56.

In certain embodiments as depicted in FIGS. 6-8, the lower assembly comprises fully threaded lag screw 35, which comprises a head connected to a shaft having threads along the shaft from the head to the tip. Fully threaded lag screw 35 preferably is a 5⁄16" diameter by 3" long stainless steel lag screw. However, fully threaded lag screw 35 may comprise alternative dimensions and be made from other materials. In operation, fully threaded lag screw 35 is configured to secure both upper arm assembly 20 and flashing 10 to the asphalt shingle roof. More specifically, fully threaded lag screw 35 extends through central opening 28 in horizontal arm 22 of upper arm assembly 20, the opening in washer 36 and the opening in flashing 10 to penetrate through asphalt shingle 50, weatherproof layer 52 and rafter 54 of the roof.

As depicted in FIGS. 6-8, upper arm assembly 20 is preferably made from aluminum and comprises a generally U-shaped member comprising a pair of symmetric half members continuously connected together. Specifically, the U-shaped member comprises first upright arm 24 and second upright arm 26 continuously connected to opposing ends of horizontal arm 22. In one embodiment, the U-shaped member comprises base 27, which is continuously connected to the bottom surface of horizontal arm 22. Base 27 is configured to be disposed on washer 36 as depicted in FIGS. 7-8.

First upright arm 24 comprises first slot 30 and second upright arm 26 comprises second slot 32. Each of first slot 30 and second slot 32 is sufficiently large to receive T-bolt 42, which is configured to be coupled to nut 44. In one embodiment, the inner and outer surfaces of first and second upright arms 24, 26 comprise a plurality of grooves 56 that surround first and second slots 30, 32.

In certain embodiments, horizontal arm 22 comprises central opening 28, which is configured to receive fully threaded lag screw 35. Central opening 28 in horizontal arm 22 is formed by inner wall 66, which comprises upper inner wall 68 continuously connected to lower inner wall 70 as depicted in FIGS. 7-8. In this configuration, the diameter of the opening at lower inner wall 70 is greater than the diameter of the opening at upper inner wall 68.

In operation, one or more of the following steps may be performed to secure alternate mounting apparatus 60 to the pair of solar panel rails 46 and the roof. First, a chalk line is generally disposed on the roof across asphalt shingles 50 to indicate the general location where solar panel rails 46 will be installed. An instrument such as a stud finder may be used to directly locate the position of rafter 54. Once rafter 54 is located, a ¼" pilot hole is drilled through asphalt shingle 50, weatherproof layer 52 and rafter 54. The ¼" drilled hole is backfilled with a sealant.

As depicted in FIGS. 6-8, central opening 28 of upper arm assembly 20, the opening of washer 36 and the opening of flashing 10 are aligned with the drilled ¼" pilot hole. Once aligned, fully threaded lag screw 35 is disposed through the openings in upper arm assembly 20, washer 36 and flashing 10 to penetrate through the ¼" pilot hole extending through asphalt shingle 50, weatherproof layer 52 and rafter 54. In one embodiment, a sealant is applied to the bottom of flashing 10 prior to being disposed around fully threaded lag screw 35. Once assembled, fully threaded lag screw 35 extends through the central opening and flange 12 of flashing 10, which is directly coupled to asphalt shingle 50. Washer 36 is beneficial because it prevents deformation of flashing 10 when fully threaded lag screw 35 is tightened into place on the roof.

In one embodiment as depicted in FIGS. 7-8, stainless steel washer 62 and rubber washer 64 are disposed around fully threaded lag screw 35 and positioned between horizontal arm 22 of the U-shaped member and the head of fully threaded lag screw 35. In a preferred embodiment, rubber washer 64 is directly in contact with the top surface of horizontal arm 22. Stainless steel washer 62 is directly in contact with rubber washer 64 and the head of fully threaded lag screw 35.

It a preferred embodiment, rubber washer 64 comprises a first thickness that is greater than a second thickness of stainless steel washer 62. However, it shall be appreciated that the dimensions of stainless steel washer 62 and rubber washer 64 may vary. In an alternative embodiment, other washers made from various materials can be used instead of stainless steel washer 62 and rubber washer 64.

In the assembled configuration as depicted in FIGS. 7-8, upper arm assembly 20 is coupled to the lower assembly by the insertion of fully threaded lag screw 35 through central opening 28 of horizontal arm 22. More specifically, a portion of threads in fully threaded lag screw 35 contacts upper inner wall 68 of central opening 28 in horizontal arm 22 before extending in space within flange 12. As such, the diameter of central opening 28 at upper inner wall 68 is less than the diameter of inner wall 72 of flange 12.

A pair of solar panel rails 46 is coupled to upper arm assembly 20. A first solar panel rail 46 is coupled to first upright arm 24 of upper arm assembly 20 by T-bolt 42 and nut 44. T-bolt 42 extends through first slot 30 in first upright arm 24 and is secured in place by nut 44. Similarly, a second solar panel rail 46 is coupled to second upright arm 26 of upper arm assembly 20 by T-bolt 42 and nut 44. T-bolt 42 extends through second slot 32 in second upright arm 26 and is secured in place by nut 44. Although the figures depict solar panel rails 46 coupled to the outer surfaces of first and second upright arms 24, 26, it shall be appreciated that solar panel rails 46 can alternatively be coupled to the inner surfaces of first and second upright arms 24, 26.

This installation of alternate mounting apparatus 60 is advantageous because it supports a pair of solar panel rails 46 while creating a complete seal of the penetration into rafter 54 of the asphalt shingle roof without modifying the structure of the roof. A seal is created at the site of the penetration into rafter 54 by washer 36, flange 12 and base 27 of horizontal arm 22 of upper arm assembly 20.

In the assembled configuration as depicted in FIGS. 7-8, washer 36 is directly in contact with flashing 10, base 27 of upper arm assembly 20 and a lower portion of outer wall 74 of flange 12. Base 27 of upper arm assembly 20 is directly in contact with washer 36 and the remaining upper portion of outer wall 74 of flange 12. This coupling of flashing 10, flange 12, washer 36 and base 27 of upper arm assembly 20 creates a complete seal that prevents the leakage of precipitation such as rain, snow, dew and other moisture present on flashing 10 from traveling into the asphalt shingle roof through the ¼" drilled pilot hole. In addition, the generally V-shaped guide rail 14 is advantageous because it serves as a barrier that deflects moisture and precipitation drifting on the flashing plate away from the opening in flashing 10.

The use of stainless steel washer 62 and rubber washer 64 is advantageous to create another seal at the top surface of horizontal arm 22 in upper arm assembly 20. Stainless steel washer 62 and rubber washer 64 prevent precipitation such as rain, snow, dew and other moisture present on the top surface of horizontal arm 22 from leaking into central opening 28 and traveling down to the asphalt shingle roof through the ¼" drilled pilot hole.

It shall be appreciated that each mounting apparatus described in certain embodiments is beneficial because it can support solar panel rails 46 thereon while limiting the number of penetrations at a single location in rafter 54. This minimizes leaks, damage and labor/maintenance costs of the asphalt shingle roof.

It shall be appreciated that multiple mounting apparatuses may be used to secure the solar panel rail to the roof as desired. In an alternative embodiment, an alternative bracket can be coupled to the lower assembly instead of upper arm assembly 20 to secure a single solar panel rail 46 thereon.

It shall be appreciated that the components of the mounting apparatuses described in several embodiments herein may comprise any alternative known materials in the field and be of any color, size and/or dimensions. It shall be appreciated that the components of the mounting apparatuses described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A mounting apparatus to secure a pair of solar panel rails to an asphalt shingle roof and minimize penetrations or damage to a rafter of the roof positioned below a plurality of asphalt shingles, the mounting apparatus configured to permit the pair of solar panel rails to support a pair of adjacent solar panels thereon, the mounting apparatus comprising:
    a lower assembly coupled to the asphalt shingle roof and comprising a flashing, a first washer and a screw, the flashing comprising a plate disposed on one of the plurality of asphalt shingles and comprising a flange, the flange comprising a tubular member extending along a perimeter of an opening in the flashing and comprising an inner wall and an outer wall, the first washer disposed on the flashing and extending circumferentially around the flange so that the first washer directly contacts a lower portion of the outer wall of the tubular member of the flange, the screw extending through the first washer, the opening in the flashing and the one of the plurality of asphalt shingles;
    an upper arm assembly directly contacting and coupled to the screw of the lower assembly, the upper arm assembly comprising a generally U-shaped member comprising a pair of upright arms continuously connected to opposing ends of a horizontal arm, the horizontal arm of the generally U-shaped member comprising an opening configured to permit the screw to pass therethrough and comprising an upper inner wall continuously connected to a lower inner wall, the lower inner wall of the opening in the horizontal arm directly contacting a remaining portion of the outer wall of the tubular member of the flange;
    wherein each upright arm in the pair of upright arms in the upper arm assembly comprises a slot configured to receive a fastener that secures one of the pair of solar panel rails thereto, thereby permitting the mounting apparatus to support the pair of solar panel rails above the asphalt shingle roof; and
    further comprising a second washer disposed around the screw and in contact with a top surface of the horizontal arm of the upper arm assembly and a third washer disposed around the screw and in contact with a head of the screw and the second washer, wherein the second washer comprises a first thickness that is greater than a second thickness of the third washer.

2. The mounting apparatus of claim 1, wherein the upper inner wall of the opening in the horizontal arm comprises a first diameter and the lower inner wall of the opening in the horizontal arm comprises a second diameter, wherein the second diameter is greater than the first diameter.

3. The mounting apparatus of claim 2, wherein the first diameter of the upper inner wall of the opening in the horizontal arm is less than a third diameter of the inner wall of the tubular member of the flange.

4. The mounting apparatus of claim 3, wherein the screw is a fully threaded bolt comprising threads in contact with the upper inner wall of the opening in the horizontal arm of the upper arm assembly.

5. The mounting apparatus of claim 4, wherein the upper arm assembly further comprises a base continuously connected to a bottom surface of the horizontal arm of the generally U-shaped member, the lower inner wall and a portion of the upper inner wall of the opening in the horizontal arm extending within the base.

6. The mounting apparatus of claim 1, wherein the first washer is made from silicon, the second washer is made from rubber and the third washer is made from steel.

7. The mounting apparatus of claim 1, wherein the first washer of the lower assembly is disposed around the screw and directly in contact with both the flashing and base of the horizontal arm of the generally U-shaped member of the upper arm assembly.

8. The mounting apparatus of claim 7, wherein the flange and opening in the plate are positioned off-center in the flashing.

9. The mounting apparatus of claim 8, further comprising a V-shaped guide rail coupled to the plate and positioned proximate the flange of the flashing.

10. The mounting apparatus of claim 9, further comprising a plurality of grooves disposed on a portion of an inner surface and a portion of an outer surface of each upright arm in the pair of upright arms in the upper arm assembly.

11. The mounting apparatus of claim 10, wherein the slot in each upright arm in the pair of upright arms is surrounded by the plurality of grooves.

12. A mounting apparatus to secure a pair of solar panel rails to an asphalt shingle roof and minimize penetrations or damage to a rafter of the roof positioned below a plurality of asphalt shingles, the mounting apparatus configured to permit the pair of solar panel rails to support a pair of adjacent solar panels thereon, the mounting apparatus comprising:
    a lower assembly coupled to the asphalt shingle roof and comprising a flashing, a first washer and a screw, the flashing comprising a plate disposed on one of the plurality of asphalt shingles and comprising a flange, the flange comprising a tubular member extending along a perimeter of an opening in the flashing and comprising an inner wall and an outer wall, the first washer disposed on the flashing and extending circumferentially around the flange so that the first washer directly contacts a lower portion of the outer wall of the tubular member of the flange, the screw extending through the first washer, the opening in the flashing and the one of the plurality of asphalt shingles; and
    an upper arm assembly directly contacting and coupled to the screw of the lower assembly, the upper arm assembly comprising a generally U-shaped member comprising a pair of upright arms continuously connected to opposing ends of a horizontal arm, the horizontal arm of the generally U-shaped member comprising an opening configured to permit the screw to pass therethrough and comprising an upper inner wall continuously connected to a lower inner wall, the lower inner wall of the opening in the horizontal arm directly contacting a remaining portion of the outer wall of the tubular member of the flange;
    wherein the screw comprises an upper portion with external threads extending through the opening in the upper arm assembly, a first portion of the external threads of the upper portion of the screw directly contacts the upper inner wall of the opening in the upper arm assembly, a second portion of the external threads of the upper portion of the screw extends through the tubular member of the flange with space present between the second portion of external threads of the screw and the inner wall of the tubular member of the flange;

wherein each upright arm in the pair of upright arms in the upper arm assembly comprises a slot configured to receive a fastener that secures one of the pair of solar panel rails thereto, thereby permitting the mounting apparatus to support the pair of solar panel rails above the asphalt shingle roof.

* * * * *